United States Patent [19]

Kuszyk et al.

[11] Patent Number: 5,434,113

[45] Date of Patent: *Jul. 18, 1995

[54] CERAMIC COMPOSITE AND METHODS OF MAKING THE SAME

[75] Inventors: Jack A. Kuszyk, Lincoln University, Pa.; Christopher R. Kennedy, Newark, Del.; Ralph R. Ballario, Jr., Prospect Park, Pa.; Craig B. Shumaker, Newark; Eric J. Van Voorhees, New Castle, both of Del.

[73] Assignee: Lanxide Technology Company, LP, Newark, Del.

[*] Notice: The portion of the term of this patent subsequent to Jun. 1, 2010 has been disclaimed.

[21] Appl. No.: 68,456

[22] Filed: May 28, 1993

Related U.S. Application Data

[60] Continuation-in-part of Ser. No. 902,515, Jun. 22, 1992, Pat. No. 5,215,666, which is a continuation of Ser. No. 763,476, Sep. 20, 1991, abandoned, which is a continuation of Ser. No. 414,198, Sep. 28, 1989, abandoned, which is a division of Ser. No. 2,048, Jan. 12, 1987, Pat. No. 4,874,569.

[51] Int. Cl.⁶ ............................................. C04B 35/65
[52] U.S. Cl. .................................... 501/127; 501/89; 264/65
[58] Field of Search ................... 501/127, 87, 89, 128; 264/65

[56] References Cited

U.S. PATENT DOCUMENTS

| | | |
|---|---|---|
| 2,741,822 | 4/1956 | Udy . |
| 3,255,027 | 6/1966 | Talsma . |
| 3,296,002 | 1/1967 | Hare . |
| 3,298,842 | 1/1967 | Seufert . |
| 3,419,404 | 12/1968 | Mao . |
| 3,421,863 | 1/1969 | Bawa et al. . |
| 3,437,468 | 4/1969 | Seufert . |
| 3,473,938 | 10/1969 | Oberlin . |
| 3,473,987 | 10/1969 | Sowards . |
| 3,789,096 | 1/1974 | Church . |
| 3,864,154 | 2/1975 | Gazza et al. . |
| 3,973,977 | 8/1976 | Wilson . |
| 4,652,413 | 3/1987 | Tiegs ........................ 264/66 |
| 4,851,375 | 7/1989 | Newkirk et al. ................ 501/88 |
| 5,215,666 | 6/1993 | Kuszyk et al. ................ 222/591 |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |
| 0851765 | 11/1985 | Greece . |

OTHER PUBLICATIONS

Drouzy et al "Oxidation of Molten Aluminum Alloys. Reaction with Refractories" Mar. 1974, Fondorie France No. 332. pp. 121–128.

Clavaud et al "Refractories for Aluminum Alloy Melting Furnaces" Sep. 1980, Lillian Brassing (From French), Jan. 1985.

*Primary Examiner*—Karl Group
*Attorney, Agent, or Firm*—Mark G. Mortenson; Jeffery R. Ramberg

[57] ABSTRACT

There is provided a method for producing a self-supporting ceramic composite comprising (1) a ceramic matrix obtained by oxidation of an aluminum zinc alloy to form a polycrystalline oxidation reaction product of the metal with an oxidant, and (2) one or more fillers embedded by the matrix. The metal alloy and permeable mass of filler having at least one defined surface boundary are oriented relative to each other so that formation of the oxidation reaction product will occur into said mass of filler and in a direction towards said defined surface boundary. On heating the metal to a first temperature above its melting point but below the melting point of said oxidation reaction product to form a body of molten parent metal, the molten metal reacts with said oxidant to form said oxidation reaction product which infiltrates said mass of filler to said defined surface boundary. The resulting infiltrated mass is heated to a second temperature in order to remove or oxidize at least a substantial portion of one or more residual non-oxidized metallic constituents from or in said infiltrated mass without substantial formation of said oxidation reaction product beyond said defined surface boundary, thereby producing a self-supporting ceramic composite.

21 Claims, 2 Drawing Sheets

CERAMIC COMPOSITE AND METHODS OF MAKING THE SAME

CROSS-REFERENCE TO RELATED APPLICATIONS

This application is a continuation-in-part of U.S. patent application Ser. No. 07/902,515, filed Jun. 22, 1992, which issued as U.S. Pat. No. 5,215,666 on Jun. 1, 1993, which was a continuation of application Ser. No. 07/763,476, filed on Sep. 20, 1991, (and now abandoned), which was a continuation of application Ser. No. 07/414,198, filed on Sep. 28, 1989, (and now abandoned), which was a divisional of application Ser. No. 07/002,048, filed on Jan. 12, 1987, which issued as U.S. Pat. No. 4,874,569 on Oct. 17, 1989.

BACKGROUND OF THE INVENTION

1. Field of the Invention

The present invention broadly relates to novel ceramic composites and methods of making the same. In a more specific aspect, the invention relates to ceramic composites particularly useful as refractories, such as heat exchanger components and steel plant refractories. The invention also relates to methods of making the ceramic composites by the directed oxidation at elevated temperatures of a parent metal into a permeable mass of filler material followed by a subsequent heating step to remove or oxidize residual non-oxidized metal constituents.

2. Description of Commonly Owned Patents and Patent Applications and Background The subject matter of this application is related to commonly owned U.S. Pat. No. 4,713,360, which issued on Dec. 15, 1987, and was based on commonly owned U.S. patent application Ser. No. 818,943, filed Jan. 15, 1986, which is a continuation-in-part of Ser. No. 776,964, filed Sep. 17, 1985, which is a continuation-in-part of Ser. No. 705,787, filed Feb. 26, 1985, now abandoned, which is a continuation-in-part of Ser. No. 591,392, filed Mar. 16, 1984, now abandoned, all in the name of Marc S. Newkirk et al. and entitled "Novel Ceramic Materials and Methods for Making the Same". This patent discloses the method of producing self-supporting ceramic bodies grown as the oxidation reaction product from a parent metal precursor. Molten parent metal is reacted with a vapor-phase oxidant to form an oxidation reaction product, and the metal migrates through the oxidation reaction product toward the oxidant thereby continuously developing a polycrystalline ceramic body of the oxidation reaction product. The ceramic body can be produced having metallic components and/or porosity, which may or may not be interconnected. The process may be enhanced by the use of an alloyed dopant, such as in the case of an aluminum parent metal oxidized in air. This method was improved by the use of external dopants applied to the surface of the precursor metal as disclosed in commonly owned U.S. patent applications Ser. No. 220,935, filed Jun. 23, 1988, now U.S. Pat. No. 4,853,352, which is a continuation of Ser. No. 822,999, filed Jan. 27, 1986, now abandoned, which is a continuation-in-part of Ser. No. 776,965, filed Sep. 17, 1985, now abandoned, which is a continuation-in-part of Ser. No. 747,788, filed Jun. 25, 1985, now abandoned, which is a continuation-in-part of Ser. No. 632,636, filed Jul. 20, 1984, now abandoned, all in the name of Marc S. Newkirk et al., and entitled "Methods of Making Self-Supporting Ceramic Materials".

The subject matter of this application is also related to that of commonly owned U.S. patent applications Ser. No. 819,397, filed Jan. 17, 1986, now U.S. Pat. No. 4,851,375, which is a continuation-in-part of Ser. No. 697,876, filed Feb. 4, 1985, now abandoned, both in the name of Marc S. Newkirk et al. and entitled "Composite Ceramic Articles and Methods of Making the Same". This patent discloses a novel method for producing self-supporting ceramic composites by growing an oxidation reaction product from a parent metal into a permeable mass of filler, thereby infiltrating the filler with a ceramic matrix. The self-supporting ceramic composite produced thereby is characterized by an essentially single-phase polycrystalline oxidation reaction product and distributed metal or voids or both, and by crystal lattice misalignments at oxidation reaction product crystallite grain boundaries less than the lattice misalignments between those neighboring oxidation reaction product crystallites having planar metal channels or planar voids, or both, disposed between said neighboring crystallites. Further, the interface boundaries between the oxidation reaction product and the metallic phase are substantially arcuate and they weave or form a tortuous microstructure also has been observed when voids were formed in place of metal.

Further developments of the foregoing methods enable the formation of ceramic composite structures which (1) contain therein one or more cavities which inversely replicate the geometry of a shaped precursor parent metal, and (2) have a negative pattern which inversely replicates the positive pattern of a parent metal precursor. These methods are described, respectively, (1) in Commonly Owned U.S. patent application Ser. No. 823,542 filed Jan. 27, 1986, now U.S. Pat. No. 4,828,785, in the name of Marc S. Newkirk et al, entitled "Inverse Shape Replication Method of Making Ceramic Composite Articles and Articles Obtained Thereby", and (2) in Commonly Owned U.S. patent application Ser. No. 896,157, filed Aug. 13, 1986, now U.S. Pat. No. 4,859,690, in the name of Marc S. Newkirk, and entitled "Method of Making Ceramic Composite Articles with Shape Replicated Surfaces and Articles Obtained Thereby".

Also, methods of making ceramic composite structures having a preselected shape or geometry were developed. These methods include the utilization of a shaped preform of permeable filler into which the ceramic matrix is grown by oxidation of a parent metal precursor, as described in Commonly Owned U.S. Pat. No. 5,017,526, in the names of Marc S. Newkirk, et al. and entitled "Method of Making Shaped Ceramic Composites", and was based on U.S. patent application Ser. No. 338,471, filed Apr. 14, 1989, which is a continuation. U.S. patent application Ser. No. 861,025, filed May 8, 1986, in the name of Marc S. Newkirk et al. and entitled "Shaped Ceramic Composites and Methods of Making the Same". Another method of making such shaped ceramic composites includes the utilization of barrier means to arrest or inhibit the growth of the oxidation reaction product at a selected boundary to define the shape or geometry of the ceramic composite structure. This technique is described in Commonly Owned U.S. patent application Ser. No. 861,024, filed May 8, 1986, now U.S. Pat. No. 4,923,832, in the name of Marc S. Newkirk et al. and entitled "Method of Making Shaped Ceramic Composites with the Use of a Barrier".

The entire disclosure of all of the foregoing Commonly Owned Pat. Applications and Pat. are expressly incorporated herein by reference.

Common to each of these Commonly Owned Patents Applications and Patent is the disclosure of embodiments of a ceramic body comprising an oxidation reaction product, most typically interconnected in three dimensions, and, optionally, one or more non-oxidized constituents of the parent metal or voids or both. The metal phase and/or the voids may or may not be interconnected depending largely on such factors as the temperature at which the oxidation reaction is allowed to proceed, the composition of the parent metal, the presence of dopant materials, etc. For example, if the growth process is continued to substantially exhaust (convert) the metal constituents, porosity will result as a partial or nearly complete replacement of the metal phase throughout the bulk of the composite body, while developing a dense ceramic skin at the surface of the composite body. In such a case, the interconnected porosity is typically accessible from the surface of the ceramic body from which matrix development initiated.

Ceramic refractories are useful as components for applications requiring good resistance to thermal shock, corrosion and erosion in contact with molten metals. Such components may, for example, be used in control means for regulating the flow of molten metals in molten metal transfer systems, for example, in the manufacture and handling of steel. Such uses include, for example, slide gates, submerged entry nozzles, and ladle shrouds. Slide gates are used for controlling the flow of molten metal from a ladle. Generally, slide gate systems including some rotary designs, consist of a fixed nozzle attached to and within a movable plate. The flow of molten metal from a ladle is controlled by moving the movable plate to fully or partially align openings. When filling the ladle and during shut-off, the openings are misaligned. The principal advantage of the slide gate system over a conventional stopper rod system is its improved reliability of shutoff, ability to modulate molten metal flow, and lack of aspiration of the molten steel product stream. However, even the best slide gate systems, such as high-alumina slide gate systems, are inadequate for certain molten metals, such as specialty steel like low-carbon, high-manganese grades. These corrosive steel compositions will seriously attack the bonding media used in most high-alumina grade slide gate systems.

Today, in the United States market, the majority of the slide gate refractories are composed of either tar-impregnated high-alumina, or fired magnesia materials. However, such slide gate refractories do not possess the thermal shock, corrosion and erosion resistance criteria to stand up to long ladle holding and teeming times and preheating, and therefore have a short service life.

The ceramic composites of this invention offer potential for use as steel plant refractories such as slide gate refractories, that do not have the foregoing deficiencies while still possessing thermal shock, corrosion and erosion resistance criteria to withstand long ladle holding and teeming times and preheating. In addition, they may be useful for other applications requiring thermal shock resistance and high temperature strength retention.

SUMMARY OF THE INVENTION

In accordance with the present invention, there is provided a method for producing a self-supporting ceramic composite comprising (1) a ceramic matrix obtained by oxidation of a parent metal comprising an aluminum-zinc alloy to form a polycrystalline material consisting essentially of an oxidation reaction product of the parent metal with an oxidant, and (2) a filler embedded by the matrix.

Generally, a precursor metal and permeable mass of filler are oriented relative to each other so that the growth of a polycrystalline material resulting from the oxidation of a precursor metal (hereinafter referred to as the "parent metal" and defined below) as described in the above-referenced Commonly Owned Patents and Patent Applications is directed towards and into a permeable mass of filler material. (The terms "filler" and "filler material" are used herein interchangeably.) The mass of filler has at least one defined surface boundary and is infiltrated with polycrystalline material to the defined surface boundary to provide a ceramic composite. Under the process conditions of this invention, the molten parent metal oxidizes outwardly from its initial surface (i.e., the surface exposed to the oxidant) towards the oxidant and into the mass of filler by migrating through its own oxidation reaction product. The oxidation reaction product grows into the permeable mass of filler. This results in novel ceramic matrix composites comprising a matrix of a ceramic polycrystalline material embedding the filler materials.

The parent metal used in the ceramic matrix growth process comprises an aluminum alloy having at least about 1% by weight zinc, and this parent metal is heated to a first temperature above its melting point but below the melting point of the oxidation reaction product thereby forming a body or pool of molten parent metal which is reacted with an oxidant, preferably a vapor-phase oxidant, e.g., air, to form the oxidation reaction product. At this first temperature or within this first temperature range, the body of molten metal is in contact with at least a portion of the oxidation reaction product which extends between the body of molten metal and the oxidant. Molten metal is drawn through the oxidation reaction product towards the oxidant and towards and into the mass of filler material to sustain the continued formation of oxidation reaction product at the interface between the oxidant and previously formed oxidation reaction product. The reaction is continued for a time sufficient to infiltrate the filler material to the defined surface boundary with the oxidation reaction product by growth of the latter, which has therein inclusions of non-oxidized metallic constituents of the parent metal.

The resulting ceramic composite comprises a filler and a ceramic matrix which is a polycrystalline oxidation reaction product and contains residual non-oxidized constituents of the parent metal, most typically aluminum and zinc but also may include other metals as well. In one preferred embodiment of the invention, the ceramic composite is heated to a second temperature (or within this second temperature range) above the first temperature, but below the melting point of the oxidation reaction product, in order to remove or oxidize at least a substantial portion of the residual non-oxidized metallic constituents, as by volatilization or oxidation of the metal constituents, from the polycrystalline material with out substantial formation of the oxidation reaction product beyond the defined surface boundary. Heating to this second temperature may be carried out either in vacuum, an inert atmosphere, or more preferably, an oxygen-containing atmosphere or, most preferably, air. Some of the removed metal phase is replaced essentially by porosity or voids. Other metal phases are oxidized in situ, converting the metal to an oxidized species. The final structure comprises a ceramic matrix and filler material, and the ceramic matrix consists essentially of oxidation reaction product and interconnected porosity with at least a portion being accessible from one or more surfaces of the ceramic composite. Preferably, the surface porosity is characterized by openings having a mean diameter of less than about 6 microns, which prevents the penetration of some materials such as molten steel.

In another preferred embodiment of the invention, it is not required that substantially all or even a significant amount of residual metal phase be removed from the ceramic matrix composite body. Instead, it may be sufficient that only a significant type of metallic constituent be removed. Specifically, it has been discovered that by removing only residual zinc dopant from the residual metal phase that continued formation of oxidation reaction product is prevented. This discovery is valid even when the remaining metal is exposed to conditions of atmosphere and temperature which are conducive to growth of such an oxidation reaction product.

The products of the present invention are essentially ceramic; that is, essentially inorganic and substantially void of metal, although there may be some inclusions or islands of metal. The products are adaptable or fabricated for use as refractories, which, as used herein, are intended to include, without limitation, industrial slide gate valve refractories that slidably contact the bottom portion of a vessel, ladle or the like, containing molten metal, such as steel, to permit and regulate the flow of molten metal through an aperture in the ladle. The refractory application of the present invention are also intended to include kiln furniture or other furnace parts as well as heat exchanger components.

As used in this specification and the appended claims, "oxidation reaction product" means the product of reaction of metals with an oxidant thereby forming an oxide compound.

As used herein and in the claims, "oxidant" means one or more suitable electron acceptors or electron sharers and may be a solid, a liquid or a gas (vapor), or some combination of these at the process conditions.

The term "parent metal" as used in this specification and the appended claims refers to that aluminum alloy metal having typically at least about 1 to 10 percent by weight zinc and which is the precursor of the polycrystalline oxidation reaction product and includes that aluminum alloy metal, and commercially available aluminum alloy metal having typically at least about 1 to 10 percent by weight zinc, as well as impurities and/or alloying constituents therein.

DETAILED DESCRIPTION OF THE INVENTION

Figure 1:
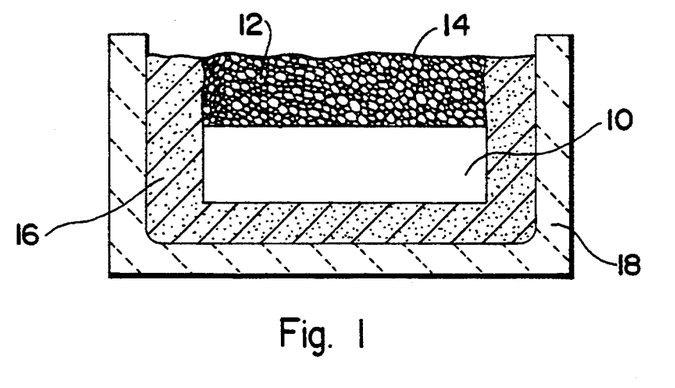
FIG. 1 is a schematic, cross-sectional view in elevation showing an assembly of an aluminum alloy parent metal, overlaying filler material and a support bed contained in a refractory crucible.

Referring to the drawings for the practice of the present invention, in FIG. 1 a parent metal 10, comprising an aluminum alloy having at least about 1 to about 10 percent by weight zinc, is formed into an ingot, billet, rod, plate or the like. This body of parent metal 10 and a permeable mass of filler material 12 having at least one defined surface boundary 14 are positioned adjacent to each other and oriented with respect to each other so that growth of the oxidation reaction product will be into the filler material 12 and in a direction towards the defined surface boundary 14 in order that the filler material 12, or a part thereof, will be infiltrated by the growing oxidation reaction product. The parent metal 10 and filler material 12 are embedded in a suitable support material 16 substantially inert under the process conditions and of such constituency so that oxidation reaction will not proceed into this bedding, and the upper or exposed surface of the mass of filler is flush with the surface of the bedding. Suitable bedding materials include, for example, certain grades of particulate alumina such as 38 Alundum manufactured by Norton Company. The assembly or lay-up is contained in a suitable refractory vessel or crucible 18.

The filler material 12 preferably comprises ceramic or refractory material and may be a lattice or array of a bed of particulates, granules, powders, aggregate, refractory fiber cloth, fibers, tubes, tubules, pellets, whiskers, or the like, or a combination of the foregoing. The array or arrangement of filler material(s) 12 may be either loose or bonded and has interstices, openings, intervening spaces, or the like, to render it permeable to the oxidant and to the oxidation reaction product growth. Further, suitable filler(s) depending upon specific end use of the product, may include for example, metal oxides, borides, nitrides, or carbides of a metal selected from the group consisting of aluminum, cerium, hafnium, lanthanum, silicon, neodymium, praseodymium, samarium, scandium, thorium, uranium, titanium, yttrium, and zirconium. Certain of these fillers may require protective coatings to prevent their reaction and/or oxidation under the conditions of the process. In one embodiment of the invention, the filler includes from about 3 percent to 10 percent by weight of silica, such as in combination with alumina. Alumina filler found especially useful has a mesh size of from about 5 to 500 (U.S. standard sieve). Silicon carbide as filler may have a mesh size of from about 500 to about 1000 (U.S. standard sieve).

The assembly is, in any case, arranged so that growth of the oxidation reaction product will occur into the filler material 12 such that void space between filler particles will be substantially filled by the grown oxidation reaction product. A matrix of the polycrystalline material resulting from the oxidation reaction product growth is simply grown into and/or around the filler material 12 so as to embed and infiltrate the latter preferably to its defined surface boundary 14 without substantially disturbing or displacing the filler material 12. Thus, no external forces are involved which might damage or disturb the arrangement of the filler material 12 and no awkward and costly high temperature, high pressure processes and facilities are required as in known conventional processes to achieve a dense composite ceramic structure. In addition, the stringent requirements of chemical and physical compatibility necessary for pressureless sintering to form ceramic composites are greatly reduced or eliminated by the present invention.

A solid, liquid, or vapor-phase oxidant, or a combination of such oxidants may be employed. Vapor-phase oxidants include, without limitation, oxygen, oxygen-argon, or other inert gas mixtures and air.

Solid oxidants include reducible oxides such as silica, tin oxide, or zinc oxide. When a solid oxidant is employed, it is usually dispersed through the entire bed of filler or through a portion of the bed adjacent to the parent metal, in the form of particulates admixed with the filler, or perhaps as coatings on the filler particles.

If a liquid oxidant is employed, the entire bed of filler or a portion thereof adjacent to the molten metal is coated or soaked as by immersion in the oxidant to impregnate the filler. A suitable liquid oxidant includes low melting glasses.

Zinc as a dopant material (which is described below in greater detail) promotes or facilitates growth of the oxidation reaction product and subsequent removal of the non-oxidized metallic constituents from the oxidation reaction product initially formed. The zinc dopant is alloyed into the aluminum parent metal, and comprises from about 1 percent by weight to about 10 percent by weight, and preferably about 4 percent to about 7 percent by weight. Additional dopant materials (as disclosed in the aforementioned commonly owned patent applications and patents may be used in conjunction with the parent metal 10 as by alloying dopant material with the parent metal 10, applying an external coating to the surface of the parent metal 10, or by incorporating or mixing the dopant materials with the filler material(s) 12. For example, magnesium may be used alone or in combination with, for example, zinc to augment the dopant action of zinc. Although the present application discusses primarily the dopant zinc, it is believed that the processes disclosed herein are generic to any dopant which finds utility in directed metal oxidation.

Referring to FIG. 1, a body of aluminum parent metal 10 along with the mass of permeable filler material 12 are positioned in a crucible or other refractory container 18 such that at least one metal surface of the parent metal 10 is exposed to the adjacent to or surrounding mass of filler material 12. If a vapor-phase oxidant is used, the mass of filler is permeable to the gaseous oxidant present in the oxidizing atmosphere (typically air at ambient atmospheric pressure). The resulting assembly is then heated to a first temperature range in the presence of the oxidant in a suitable furnace (not shown in the drawings) to elevate the temperature thereof in the region, typically, with air as the oxidant, between about 850° C. to about 1450° C., or more preferably, between about 950° C. to about 1100° C. to form a pool or body of molten parent metal. The temperature region depends upon the filler material 12, dopant or dopant concentrations, oxidant, or the combination of any of these. At this temperature region parent metal transport begins to occur through the oxide skin normally protecting the aluminum parent metal.

The continued high temperature exposure of the parent metal 10 to the oxidant allows the continued oxidation of parent metal 10 to form a polycrystalline oxidation reaction product of increasing thickness. This growing oxidation reaction product progressively infiltrates the permeable mass of filler material 12 with an inter connected oxidation reaction product matrix which also may contain non-oxidized parent metal constituents, thus forming a cohesive composite. The growing polycrystalline matrix impregnates or infiltrates the filler material 12 at a substantially constant rate (that is, a substantially constant rate of thickness increase over time), provided there is a relatively constant source of oxidant, for example, by allowing a sufficient interchange of air (or oxidizing atmosphere) in the furnace. Interchange of oxidizing atmosphere, in the case of air, can be conveniently provided by vents in the furnace. Growth of the matrix continues for a time sufficient for the polycrystal line oxidation reaction product to infiltrate the mass of filler material 12 to the defined boundary 14, which preferably occurs when substantially all of the parent metal 10 is consumed, i.e., substantially all of the parent metal 10 has been converted into the matrix.

The ceramic composites initially produced by the oxidation of the aluminum alloy parent metal with the oxidant comprises the filler material(s) infiltrated and embedded, preferably to the defined boundary, with the polycrystalline oxidation reaction product of the parent metal with the oxidant, and one or more non-oxidized metallic constituents of the parent metal including aluminum and zinc, and other metals depending on the parent metal composition. The volume percent of residual metal (non-oxidized metallic constituents) can vary over a wide range depending on the particular processing conditions, and in particular whether or not the oxidation reaction process is conducted largely to exhaust aluminum alloy parent metal. By way of example only, a ceramic composite formed from aluminum alloy metal and 50 volume percent filler processed in air at about 1000° C. may contain about 0.5 to 10 volume percent residual metal.

In order to produce a ceramic composite substantially devoid of metallic constituents, such as for a composite used for slide gate valve refractories, the non-oxidized metallic constituents (residual metal) present after the first heat treatment are substantially removed and/or oxidized in situ by a second or subsequent heating step. The initially formed ceramic composite is heated at a temperature higher than the temperature first employed in forming the initial ceramic composite. This second heating step may be accomplished by elevating the temperature to effect the substantial volatilization and/or oxidation of the residual metal. This second heating step may be carried out in an oxygen-containing, a nitrogen-containing or inert atmosphere or in a vacuum. An oxygen-containing atmosphere is sometimes preferred because removal of substantial quantities of the residual metal by oxidation thereof can be effected at a lower temperature than removal by volatilization in an inert atmosphere or in vacuum. Air at ambient atmospheric pressure is most preferred for reasons of economy. Conversely, if it is sufficient to remove one or a small number of metallic constituents of the residual metal phase, such as, for example, the dopant constituent, an atmosphere other than an oxygen-containing atmosphere may be preferred.

For the embodiment in which it is desired to remove a substantial fraction of the residual metal in a ceramic matrix composite, the assembly is heated in the furnace in the presence of the desired atmosphere to elevate the temperature thereof in the region typically between about 1250° C. to about 2000° C.; more preferably at least about 1400° C., or from about 1400° C. to about 1600° C. This temperature is higher or above the temperature that was employed to produce the initially formed ceramic composite. At these elevated temperatures, any residual non-oxidized metallic constituents of the aluminum alloy parent metal are essentially removed or converted to an oxide without any further growth beyond the defined surface boundary. It is believed that a majority of the residual non-oxidized metallic constituents are essentially helped to be removed through volatilization of the zinc dopant. Some of the residual aluminum metal will oxidize in situ without effecting the defined boundary of the part. The zinc dopant not only promotes or facilitates growth of the oxidation reaction product, but volatilizes at elevated temperature, generating porosity and high surface area which then promotes oxidation of residual non-oxidized metallic constituents of the aluminum alloy parent metal leaving minimal residual metal in the composite.

For other applications, it may not be necessary, or even desirable, to remove or oxidize substantially all of the residual metal remaining in the ceramic matrix of the composite body. Instead, it may be sufficient that only a single type or a significant amount of one metallic constituent be removed. Specifically, it has been discovered that by removing only residual zinc dopant from the residual metal phase that continued formation of oxidation reaction product is prevented. This discovery is valid even when the remaining metal is exposed to conditions of atmosphere and temperature which are conducive to growth of such an oxidation reaction product.

As was previously mentioned, the amount of zinc that is to be alloyed into the aluminum parent metal preferably comprises from about 4 percent by weight to about 7% by weight (based on the weight of the aluminum parent metal labelled as 10 in FIG. 1). The zinc may be alloyed directly with unalloyed commercial purity aluminum, e.g., of 99%, 99.5% or 99.7% grade. If so desired, high or super purity aluminum, e.g., 99.9% or purer, may be used as a base for the alloying addition. This may be desirable where the refractory end-product is to be used in conjunction with very high purity molten metals where even traces of contaminants are unwanted. On the other hand, certain zinc-containing commercial wrought alloys, e.g., of the Aluminum Association 7000 series or casting alloys, e.g., of the Aluminum Association 700 series may be used where the zinc content is above 1.0%, preferably above 4.0%, and where the presence of other alloying elements is not harmful to the end use. For example, alloy 7021 which contains 5.0–6.0% zinc, 1.2–1.8% magnesium, 0.08–0.18% zirconium with permitted maxima for the following elements: silicon 0.25%; iron 0.40%; copper 0.25%; manganese 0.10%; chromium 0.05%; titanium 0.10%; other elements each 0.05% up to a total of 0.15% (all percentages by weight) the balance being aluminum, is one among several such alloys which would comprise a suitable parent metal for the invention. In this case, the magnesium present in the alloy augments the dopant action of zinc.

When desired, the composite may be cooled and removed from the furnace. The coo1ed body may then be machined. (e.g., such as by milling, polishing, grinding or the like) on one or more surfaces to desired tolerances. This alternative may be particularly desirable in the manufacture of ceramic articles requiring close tolerances.

Figure 2:
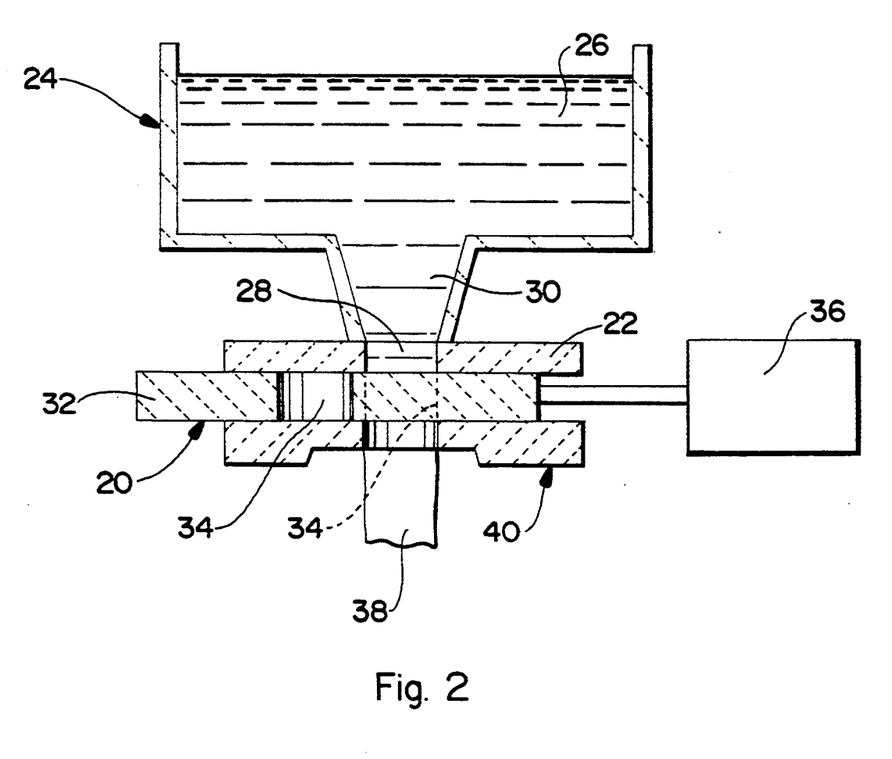
FIG. 2 is a partial schematic, vertical cross-sectional view showing a slide gate valve, slidably disposed between a top plate of the bottom portion of a ladle and a tube holder that holds a tube through which molten metal passes after leaving the ladle.

In one preferred embodiment of the present invention, displayed in FIG. 2 the ceramic composites of the invention can be fabricated for use as slide gate valve refractories. The slide gate valve, generally illustrated as 20 in FIG. 2, contacts a top plate 22 or the bottom portion of a ladle, generally illustrated as 24, containing molten metal 26 (i.e., molten steel). Top plate 22 is integrally bound to the ladle 24 and has a top plate aperture 28 which is indirect communication with a ladle aperture 30 disposed in the bottom of the ladle 24. The slide gate valve 20 has a slide gate structure 32 with at least one slide gate aperture 34. A drive means 36, such as a throttling cylinder, or the like, is coupled to the slide gate 20 to slide (or rotate) the slide gate along the bottom surface of the top plate 22 to either align or misalign the slide gate aperture 34 with the top plate aperture 28 and the ladle aperture 30. A tube holder means, generally illustrated as 40, holds a tube 38 and supports the slide gate valve 20, the top plate 22, and the ladle 24 that is bound to the top plate 22. Tube 38 conducts the flow of molten metal 26 after the same leaves ladle 24 through slide gate 20. If the slide gate valve refractory 20 is disposed by the drive means 36 such that the aperture 34 of the slide gate valve refractory 20 is totally misaligned with top plate aperture 28 and with ladle aperture 30 of the ladle 24, molten metal 26 will not flow from the ladle 24. Also, molten metal 26 (as will be explained in greater detail hereinafter) will not penetrate into and through the porosity of the ceramic matrix in the structure 32 of the slide gate valve 20. As depicted in FIG. 2 by the label 34 which is connected to a dotted line, when the slide gate valve 20 is slidably positioned along the top plate 22 and the bottom portion of the ladle 24 such that the slide gate aperture 34 is generally aligned with the top plate aperture 28 and with ladle aperture 30 of the ladle 24, molten metal 26 will flow by gravity from the ladle 24 through the respective apertures into the tube 38.

The slide gate structure 32 must be extremely flat, i.e., to within tolerances of 1/2000 of an inch or less, and must be held tightly against the bottom surface of the top plate 22 so that molten metal will not leak out between the contacting surfaces. The slide gate structure 32, as well as the structure of the top plate 22, is composed of refractory materials or components that are capable of being machined (such as by milling, grinding, polishing, or the like) extremely smooth so the structure of the top plate 22 and the structure 32 of the slide gate valve 20 cannot pull out the grains of the other during opening and closing of the slide gate valve 20 with the coupled drive means 36. The structure 32 of the slide gate valve 20 should not have pores which are too large since molten metal would penetrate the pores and weaken the structure 32. Furthermore, the slide gate structure 32 must possess extremely good thermal shock resistance and must be composed of refractory materials or components that are strong enough to resist chemical corrosion and erosive effects from flowing molten metal compositions. In order to fabricate a slide gate structure 32 from a ceramic composite possessing the foregoing properties and/or criteria, the ceramic composite should contain a ceramic matrix substantially consisting essentially of non-metallic and inorganic material(s). Any substantial amount of non-oxidized metallic constituents within a ceramic composite, such as aluminum, could be detrimental to the performance of the material by lowering its high temperature strength, possibly exhibiting oxidation overgrowth beyond the slide gate dimensions and causing the gate components to bond together, as well as affecting thermal shock performance. Hence, the slide gate valve 20 would fail in its function or have to be replaced after minimal use, most likely due to spalling, cracking, or surface overgrowth.

The ceramic composite structure obtained after selectively removing one or more metallic constituents of the residual parent metal phase of the composite may be nearly identical to the structure prior to the removal process. On the other hand, the ceramic composite structure obtained after removing and/or oxidizing substantially all of the residual non-oxidized metallic constituents of the aluminum parent metal is a coherent ceramic composite typically having from about 5% to about 98% by volume of the total volume of the composite structure comprised of one or more of the filler material embedded within a polycrystalline ceramic matrix. The polycrystalline ceramic matrix is comprised of about 94.5% or more by weight (of the weight of polycrystalline oxidation reaction product) of interconnected alpha-alumina, about 5% or less of zinc aluminate, and about 0.5% or less by weight of non-oxidized metallic constituents of the aluminum parent metal.

The polycrystalline ceramic matrix exhibits some porosity ranging from about 2% by volume to about 25% by volume of polycrystalline ceramic matrix, preferably not more than about 10%. It is believed that some porosity is required in order to provide the desired thermal shock resistance of the refractory product. At least a portion of the porosity is accessible from the surface, and typically about 5% of such porosity have pore openings whose diameter measures from about 1 micron to about 8 microns. Preferably, the openings of the porosity accessible from the surface have a mean diameter of about 6 microns or less, where 6 is the mean of a normal Gaussian distribution curve. An alumina-based ceramic composite having openings on its surface that measure about 6 microns or less in diameter is particularly useful in fabricating a slide gate refractory since molten steel will not penetrate its structure.

The ceramic composite structure obtained after removing or oxidizing substantially all of the residual metallic constituents of this composite body possesses the following properties: a three-point bend test for hot Modulus of Rupture (MOR) of from about 3500 psi to about 6500 psi at 2550° F. (1400° C.) in $N_2$, depending on the size of the alumina filler material; a thermal shock resistance parameter (resistance to crack propagation, Rst) of about 60° F./in.$^{\frac{1}{2}}$; *a volume stability (thermal expansion in accordance with ASTM E228.71 from room temperature to 1500° C. and then cooled)* of 0.15% or less in linear change with no rate changes that result in cracking or distortion; and a corrosion resistance (air/metal line wear in inches with a major diagonal 1×1 inch bar, 20 min. spin test, Al-killed steel, as described in the example below) of 0.04 inch or less.

The ceramic composite of this invention exhibits substantially clean grain boundaries wherein the grain boundaries at the interconnection of the crystallites have no other phase present. Most notably, the grain boundaries are devoid of any siliceous phase. This feature is particularly important for steel plant refractories. Low-melting silicates are found in almost every traditional alumina refractory, and this material reacts with the molten iron causing dissolution into the liquid steel and ultimately leading to cracking, spalling and failure of the structure.

In addition, the composites of one embodiment of the present invention do not require extra precautions to prevent oxidation of the bonding phase because it is a fully oxidized matrix, which is in contrast to carbon-bonded alumina refractories presently being used in Japan in the slide gate market. Moreover, the composites produced according to the embodiment in which only a fraction of the residual metal of the composite has been removed may require only minimal precautions to prevent continued oxidation of the residual metal during service. Specifically, if the dopant constituent(s) has been removed from the metal component of the ceramic matrix, additional function of oxidation reaction product is unlikely to proceed from the remaining metallic constituents. Instead, exposure of such a composite to an oxidizing atmosphere may result in classic diffusion-controlled oxidation of metal.

A particularly effective method for practicing this invention involves forming the filler into a preform with a shape corresponding to the desired geometry of the final composite product. The preform may be prepared by any of a wide range of conventional ceramic body formation methods (such as uniaxial pressing, isostatic pressing, slip casting, sedimentation casting, tape casting, injection molding, filament winding for fibrous materials, etc.) depending largely on the characteristics of the filler. Initial binding of the particles prior to infiltration may be obtained through light sintering or by use of various organic or inorganic binder materials which do not interfere with the process or contribute undesirable by-products to the finished material. The preform is manufactured to have sufficient shape integrity and green strength, and should be permeable to the transport of oxidation reaction product, preferably having a porosity of between about 5 and 90% by volume and more preferably between about 25 and 50% by volume. Also, an admixture of filler materials and mesh sizes may be used. The preform is then contacted with molten parent metal on one or more of its surfaces for a time sufficient to complete growth and infiltration of the preform to its surface boundaries.

As disclosed in U.S. patent application Ser. No. 861,024, filed on May 8, 1986, now U.S. Pat. No. 4,923,832, in the names of Marc S. Newkirk et al. and entitled "Method of Making Shaped Ceramic Composites with the Use of a Barrier" and assigned to the same owner, a barrier means may be used in conjunction with the filler material or preform to inhibit growth or development of the oxidation reaction product beyond the barrier. After the first heat treating step and before the second heating step, the barrier is removed by any suitable means. Suitable barriers may be any material, compound, element, composition, or the like, which, under the process condition of this invention, maintains some integrity, is not volatile, and preferably is permeable to the vapor-phase oxidant while being capable of locally inhibiting, poisoning, stopping, interfering with, preventing, or the like, continued growth of oxidation reaction product. Suitable barriers for use with aluminum parent metal include calcium sulfate (plaster of Paris), calcium silicate, and Portland cement, and mixtures thereof, which typically are applied as a slurry or paste to the surface of the filler material. A preferred barrier comprises a 50/50 admixture of plaster of Paris and calcium silicate. These barrier means also may include a suitable combustible or volatile material that is eliminated on heating, or a material which decomposes on heating, in order to increase the porosity and permeability of the barrier means. The barrier is readily removed from the composite as by grit blasting, grinding, etc.

As a result of using a preform, especially in combination with a barrier means, a net shape is achieved, thus minimizing or eliminating expensive final machining or grinding operations.

As a further embodiment of the invention and as explained in the Commonly Owned Patent Applications and Patent, the addition of dopant materials in conjunction with the parent metal can favorably influence the oxidation reaction process. The function or functions of the dopant material can depend upon a number of factors other than the dopant material itself. These factors include, for example, the particular parent metal, the end product desired, the particular combination of dopants when two or more dopants are used, the use of an externally applied dopant in combination with an alloyed dopant, the concentration of the dopant, the oxidizing environment, and the process conditions. The dopant(s) used in the process should be substantially removed or oxidized during the second heating step so as to not adversely affect the properties of the end product.

The dopant or dopants used in conjunction with the parent metal (1) may be provided as alloying constituents of the parent metal, (2) may be applied to at least a portion of the surface of the parent metal, or (3) may be applied to the filler bed or preform or to a part thereof, or any combination of two or more of techniques (1), (2) and (3) may be employed. For example, an alloyed dopant may be used in combination with an externally applied dopant. In the case of technique (3), where a dopant or dopants are applied to the filler bed or preform, the application may be accomplished in any suitable manner, such as by dispersing the dopants throughout part or the entire mass of the preform as coatings or in particulate form, preferably including at least a portion of the preform adjacent to the parent metal. For example, silica admixed with an alumina bedding is particularly useful for aluminum parent metal oxidized in air. Application of any of the dopants to the preform may also be accomplished by applying a layer of one or more dopant materials to and within the preform, including any of its internal openings, interstices, passageways, intervening spaces, or the like, that render it permeable.

The invention is further illustrated by the following examples.

EXAMPLE 1

Aluminum Association 712.2 aluminum casting alloy ingot measuring 1 inch by 2½ inches by 8½ inches was placed horizontally upon a layer of a mixture of commercial 8-14 grit pure alumina (Norton Co., 38 Alundum) and 5 weight percent 500-mesh $SiO_2$ (Pennsylvania Glass and Sand Co.) and was subsequently covered with the same material to a depth of approximately three inches. The 712.2 alloy comprised, by weight percent, about 5 to 6.5% zinc, about 0.25% or less copper, about 0.4% to 0.6% chromium, about 0.15% or less silicon, about 0.40% or less iron, about 0.25% or less to 0.50% magnesium, about 0.10% or less manganese, about 0.15% to 0.25% titanium, about 0.20% or less of other metals with the maximum amount of any one other metal being about 0.05% or less, and the balance being aluminum.

The alumina-embedded ingot was contained within a suitable refractory crucible and the entire assembly was placed into an air atmosphere furnace. The furnace allowed the entry of ambient air through natural convection and diffusion through random openings in the furnace walls. The assembly was processed for 144 hours at a setpoint temperature of 1000° C. after allowing an initial eight-hour period for the furnace to reach the setpoint temperature. After the 144 hour heating period, eight additional hours were allowed for the sample to cool to below 600° C., after which the resulting ceramic composite was removed from the furnace. The ceramic composite contained residual zinc, aluminum and silicon.

In order to remove at least a substantial portion of the residual zinc, aluminum, and silicon, the ceramic composite was again contained within a refractory crucible, placed into the air furnace, and was processed for eight hours at a setpoint temperature of 1400° C. after allowing an initial eight-hour period for the furnace to reach the setpoint temperature. After the eight-hour heating period, eight additional hours were allowed for the ceramic composite to cool to below 600° C., after which the ceramic composite was removed from the furnace. The alumina matrix changed from a gray, metallic color to a white color after the second heating step of 1400° C., indicating very little presence of residual metal. The microstructure of the ceramic composite revealed a very homogeneous, porous, fine-grained (approximately 6 micron diameter) alumina matrix. The residual zinc volatilized, effectively driving off any residual aluminum and silicon and providing space for in situ oxidation of some of the aluminum during the second heating step at 1400° C., ultimately creating a more porous, low metal content ceramic composite. The second heating step at 1400° caused no further substantial oxidation reaction product growth beyond the original defined boundary of the composite, even though aluminum, zinc, and silicon metals were present prior to a second heating at 1400° C. Bend testing showed a MOR (room temperature) of approximately 4000 psi for the final composite, and a strength retention (MOR) of about 2400 psi after five rapid heat-up and cool-down cycles between room temperature and 1200° C. with ten-minute soak periods at each temperature. X-ray analysis of the ceramic product showed alumina and some minor amounts of zinc aluminate.

To examine the effect of molten steel on this ceramic product, the ceramic product was cut into four pieces and engaged to four sample holders threaded to a bearing-supported shaft of a spin test apparatus consisting of a steel frame holding a variable speed electric motor connected to the bearing-supported shaft. The four pieces of ceramic product were rotated with the sample holders about the central axis of the bearing-supported shaft. The outer edge of each of the ceramic product pieces traveled at 600 inches per minute when rotated at 48 rpm. A sheet grade steel (low carbon, sulfur, phosphorus, and oxygen) was heated to 1593° C. and the surface deslagged prior to the start of the test. The four pieces of ceramic product were heated to 1093° C. and then immersed in the molten steel and rotated at 48 rpm by the spin test apparatus for 20 minutes. The four pieces of ceramic product were removed from the sample holders, cooled, and examined to determine the effect of molten steel upon the ceramic product. It was determined that the ceramic product resisted significant penetration of steel, did not react to any extent with the liquid steel, and did not fracture during the test due to any thermal gradients. Thus, the ceramic composite product appears to be a useful steel refractory, such as for slide gate valves that are in contact with molten steel.

EXAMPLE 2

This Example demonstrates that at least a portion of at least one of the residual parent metal alloy remaining in the ceramic matrix of a ceramic matrix composite body may be removed through volatilization at elevated temperatures in an inert atmosphere. Moreover, this Example demonstrates that a metal which serves or operates as a dopant material during directed metal oxidation may be removed subsequent to directed metal oxidation by means of volatilization at elevated temperatures in an inert atmosphere.

A hollow preform roughly approximating a double flanged tube closed on one end was fabricated by a slip casting procedure.

First, some of the silicon carbide filler material was partially oxidized. Specifically, 500 grit 39 CRYSTOLON ® silicon carbide particulate (average particle size of about 17 microns, Norton, Co., Worcester, Mass.) was loaded into a refractory boat measuring approximately 14 inches (356 mm)×11 inches (279 mm)×6 inches (152 mm) which was lined with ceramic fiber paper (Fiberfrax ®, Carborundum Co., Niagara Falls, N.Y.) to a depth of approximately 3 inches (75 mm). The boat was placed into an air atmosphere resistance heated electric furnace and heated to about 1325° C. in about 15 hours, held at about 1325° C. for about 24 hours and then allowed to cool to room temperature. Upon heating, part of the silicon carbide was oxidized to form silica ($SiO_2$). The silica content of the oxidized powder comprised between about 15 and 25 percent of the total weight of the powder. Comminution of the partially oxidized powder was accomplished by jaw crushing, followed by sieving until the agglomerates were broken down to about −200 mesh (80 microns), at which point the powder was ready for further processing pursuant to slip casting. Similarly, 320 grit (32 microns) and 1000 grit (6 microns average particle size) silicon carbide particulate fractions (39 CRYSTOLON ®, Norton, Co.) were similarly fired (separately) to produce similar quantities of silica. For example, the 1000 grit silicon carbide fraction was fired for about 3.5 hours at a temperature of about 1250° C. to produce a silica content of about 18 weight percent.

Next, a casting slip was prepared. Into a 30 gallon porcelain ball mill were placed about 67 kg of approximately 1 inch (25 mm) diameter alumina grinding media spheres, about 19.4 kg of deionized water, about 20 grams of Darvan 821A deflacculants (R.T. Vanderbilt Co., Norwalk, Conn.), about 10 grams of SUPERLOID ™, ammonium alginate thickener (Kelco Division of Merck and Co., Rahway, N.J.) about 16 kg of as-received silicon carbide having an average particle size of about 0.6 micron (Grade FCPO7NC, Norton Co., Worcester, Mass.), about 16 kg of the partially oxidized 320 grit (32 microns average particle size) 39 CRYSTOLON ® silicon carbide (Grade F320), about 28 kg of the partially oxidized 500 grit (17 microns average particle size) 39 CRYSTOLON ® silicon carbide (Grade F500, Norton Co.), and about 20 kg of the partially oxidized 1000 grit (6 micron) 39 CRYSTOLON ® silicon carbide (Grade F1000, Norton Co.).

The ball mill was sealed and the slip was milled for about 16 hours, after which time the slip was drained from the mill and characterized in terms of specific gravity (using bulk weight and volume measurement) and in terms of viscosity (using a Model RVT Brookfield Viscosimeter from Brookfield Engineering Laboratories, Inc., Stoughton, Mass.).

Figure 3:
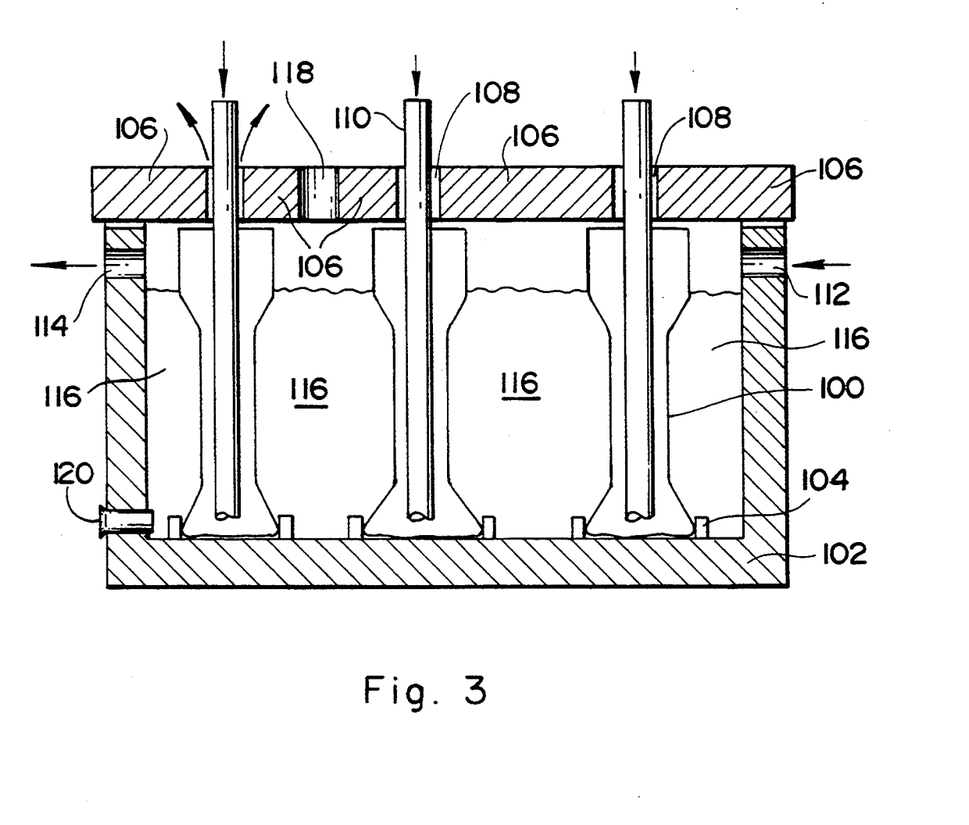
FIG. 3 is a cross-sectional schematic view of an assembly used to fabricate the ceramic matrix composite bodies of Example 2.

A two piece plaster mold having an internal cavity approximating the shape shown by preform 100 in FIG. 3 and which cavity measured approximately 16 inches (406 mm) in height by about 4 inches (102 mm) in maximum diameter was moistened slightly with water, assembled and held together with rubber bands.

The slip was then cast into the mold cavity, pouring slowing down the side of the mold to avoid trapping air in the slip. When the desired thickness of about 0.25 inch (6 mm) was achieved, the excess slip was poured out of the mold.

The slip cast preform continued to dry in the mold for about 16 hours. The preform was then removed from the mold and allowed to dry on a rack in a drying chamber at a temperature of about 43° C. for at least about 16 hours.

The cast and dried preform was then sanded with sandpaper to provide clean, smooth surfaces free of casting mold lines, then placed on top of slotted firebricks and loaded into a resistance heated air atmosphere furnace at a temperature of about 20° C. The furnace was heated to a temperature of about 1025° C. at a rate of about 125° C. per hour, held at about 1025° C. for about 24 hours and then cooled to room temperature with the power off at the furnace's natural cooling rate. Depending upon the local relative humidity, the firing time at about 1025° C. was adjusted in the range of 12 to 28 hours to yield a weight increase due to additional silicon carbide oxidation of about 3.5 to 4.5 percent.

The fired preform was then coated on its interior surfaces with a slurry comprising by weight about 50 percent fine calcium aluminate powder (Grade CA-14, Alcoa Industrial Chemicals Division, Bauxite, Ark.) and the balance isopropyl alcohol. To insure uniformity, the slurry had been roll mixed for about 2 hours prior to coating. The slurry dried in air at ambient temperature in the course of a few minutes to provide a barrier layer during subsequent directed metal oxidation. Twelve such preforms were processed in this manner.

Referring to FIG. 3, an assemblage for performing the directed metal oxidation process through the preforms was fabricated as follows. Twelve of the hollow slip cast preforms 100 were placed in a hexagonal arrangement onto the floor of a refractory boat 102. Alignment pins 104 helped to maintain each preform in its proper fixed relationship within the refractory boat during the directed metal oxidation for producing the ceramic matrix. Refractory plate 106 was then placed on top of the refractory boat 102. The preforms were of such a height that the top of each preform almost contacted refractory plate 106. Refractory plate 106 featured apertures 108 in substantial alignment with the longitudinal axis of each preform 100. A vapor-phase oxidant comprising air was supplied to the interior of each preform by means of a compressed air distribution system 110 comprising INCONEL ® (registered trademark of International Nickel Co.) refractory metal tubes sheathed with ceramic extending down the center of each preform 100 and terminating about 2 inches (51 mm) from the bottom of each preform. A reservoir comprising a second refractory boat containing about 359 pounds (163 kg) of a parent metal comprising by weight about 6 percent zinc, about 23 percent silicon and the balance aluminum was placed on top of refractory plate 106 (this reservoir is not shown in the figure) to complete the assemblage. The refractory boat 102, refractory plate 106 and reservoir were each fabricated from PERMATECH castable refactory (Grade Beta-two, Alcoa Industrial Chemicals Div., Bauxite, Ark.).

The above-described assemblage was placed into a resistance heated air atmosphere furnace at about 20° C. The gas distribution system 110 was activated so as to supply about 10 standard cubic feet per hour (SCFH) (4.7 standard liters per minute (SLPM)) of air to the interior of each preform 100 at about atmospheric pressure. Moreover, an inert gas (under the local processing conditions) comprising nitrogen was introduced through inlet port 112 at a rate of about 20 SCFH (9.4 SLPM) and exhausted through exit port 114 at the opposite side of the circular refractory boat 102. The purpose of the nitrogen gas was to provide an inert atmosphere blanket within the refractory boat 102 exterior to the preforms 100 so as to prevent or at least minimize the formation of oxidation reaction product growth from the exposed surface of the molten parent metal 116 during the ceramic matrix formation process.

The furnace and its contents were then heated from about 20° C. to a temperature of about 750° C. at a rate of about 40° C. per hour. After maintaining a temperature of about 750° C. for about 10 hours, the temperature was then further increased to a temperature of about 940° C. at a rate of about 40° C. per hour. By the time the temperature has reached about 940° C., the parent metal in the reservoir above had melted and rundown into the refractory boat 102 through orifice 118 in refractory plate 106. After maintaining a temperature of about 940° C. for about 58 hours, the temperature was further increased to a temperature of about 950° C. at a rate of about 40° C. per hour. After maintaining a temperature of about 950° C. for about 7 hours, the temperature was reduced to a temperature of about 900° C. at a rate of about 150° C. per hour. At a temperature of about 900° C., the furnace was opened and drain plug 120 was removed from the refractory boat 102, thereby allowing molten residual parent metal 116 to drain from the refractory boat 102. After substantially all of the residual parent metal 116 had drained from the refractory boat 102, the furnace was again closed and the gases introduced through the gas distribution system 110 and inlet port 112 were switched from air and nitrogen, respectively, to argon. The flow rates were left unchanged. The temperature of the refractory boat 102 and its contents had by now dropped to about 700° C. Accordingly, the temperature of the refractory boat 102 and its contents was then increased to a temperature of about 1000° C. at a rate of about 40° C. per hour. After maintaining a temperature of about 1000° C. for about 20 hours, the temperature was decreased back to a temperature of about 20° C. at a rate of about 150° C. per hour. When the temperature of the refractory boat and its contents had substantially cooled to about 20° C., the furnace was reopened and the above-described assembly was removed.

The assembly was disassembled and each of the twelve preforms 100 were removed from the refractory boat 102. Inspection of each preform revealed that a ceramic matrix comprising aluminum oxide and a metal component comprising some residual aluminum alloy parent metal had infiltrated each preform during the thermal processing. Furthermore, the approximately 20 hour exposure at a temperature of about 1000° C. in argon volatilized a substantial fraction of the zinc metallic constituent from the residual parent metal component in each of the twelve formed ceramic composite bodies as shown by wet chemical analysis of the residual metal phase of such heat treated versus non-heat treated ceramic composite bodies.

Thus, this Example demonstrates that at least one metallic constituent of the residual metal component of a ceramic matrix composite body may be removed through volatilization at elevated temperatures in an inert atmosphere. Specifically, this Example demonstrates that a metal such as zinc, which serves or operates as a dopant material during formation of oxidation reaction product may be removed subsequent to development of the ceramic matrix comprising the oxidation reaction product by means of volatilization at elevated temperatures in an inert atmosphere.

EXAMPLE 3

This Example further demonstrates a process for removing a portion of the residual metal phase of a ceramic matrix composite body. Specifically, the method of the present Example was substantially the same as was described in Example 2 with the exception that the slip composition differed slightly. Specifically, the slip used to fabricate the preform of the present Example comprised by weight about 15.49 percent of deionized water, about 0.0027 percent of Darvan 821A deflacaulant (R. T. Vanderbilt, Norwalk, Conn.), about 0.01 percent of SUPERLOID TM ammonium alginate thickener (Kelco Div. of Merck Co., Rahway, N.J.), about 33.8 percent of the as-received submicron sized silicon carbide particulate (Grade FCP07NC, Norton Co., Worcester, Mass.), about 16.9 percent of the partially oxidized 320 grit (32 microns average particle size) 39 CRYSTOLON ® silicon carbide particulate (Grade F320, Norton Co.), about 33.8 percent of the partially oxidized 500 grit (17 microns average particle size) 39 CRYSTOLON ® silicon carbide particulate (Grade F500, Norton Co.) and the balance comprising the approximately 1 inch (25 mm) diameter alumina grinding media.

EXAMPLE 4

This Example further demonstrates a process for removing a portion of the residual metal phase of a ceramic matrix composite body.

Specifically, this Example demonstrates that a dopant comprising zinc can be removed from the residual metal component of a ceramic matrix composite by heat treating the composite body in a nitrogen-containing atmosphere.

A ceramic matrix composite body was fabricated in substantially the same manner as was described in Example 2 with the exception that the formed composite body comprised a straight-walled tube having an outside diameter of about 2 inches (51 mm).

Whatever barrier coating remained on each tube following the development of the ceramic matrix was removed by sandblasting; however, whatever residual parent metal adhered to the surface of the composite body was left attached. Sufficient samples for about nine experimental heat treatments were then provided by sectioning or breaking one or more such ceramic matrix composite tubes such that each sample had a mass of between about 250 and about 300 grams. The lay-up for each experimental run comprised a graphite boat containing a plurality of alumina rods which provided support for each sample to be heat treated.

Each lay-up was then placed into the vacuum chamber of a vacuum furnace at about 20° C. The chamber door was sealed and the vacuum chamber was evacuated to a final pressure of about $3 \times 10^{-4}$ Torr and subsequently backfilled with commercially pure nitrogen gas. A nitrogen gas flow rate of about 2 standard liters per minute (SLPM) at a slight positive pressure of about 1–2 psig (7–14 KPAG) was established and maintained. The temperature of the vacuum furnace and its contents was then increased from a temperature of about 20° C. to the heat treatment temperature reported in Table 1 at a rate of about 400° C. per hour. After maintaining the heat treatment temperature for the time reported in Table 1, power to the heating elements of the furnace was interrupted and the furnace and its contents were allowed to cool naturally. Once the furnace and its contents had cooled substantially back to about 20° C., the vacuum chamber was opened and the lay-up was removed. Table I reports the effect of each heat treatment on the weight of each ceramic matrix composite sample so treated.

In contrast to non-heat treated ceramic matrix composite bodies, in no instance could subsequent heating of the present heat treated ceramic matrix composite bodies in air to a temperature of about 940° C. produce additional growth of oxidation reaction product from the surface of the composite body.

Thus, this Example further demonstrates a process for removing a portion of the residual metal phase of a ceramic matrix composite body. Specifically, this Example demonstrates the removal of a metallic constituent comprising the zinc dopant through volatilization during a heat treatment conducted in an atmosphere comprising nitrogen.

TABLE I

| Run | Soak Time | Soak Temp. | Weight Before | Weight After |
|---|---|---|---|---|
| A | 2 h | 1200° C. | 258.25 gms | 256.41 gms |
| B | 8 h | 1200° C. | 269.09 gms | 267.23 gms |
| C | 24 h | 1200° C. | 294.04 gms | 292.19 gms |
| D | 2 h | 1100° C. | 253.15 gms | 251.28 gms |
| E | 8 h | 1100° C. | 264.22 gms | 265.64 gms |
| F | 24 h | 1100° C. | 257.98 gms | 255.27 gms |
| G | 2 h | 1000° C. | 252.77 gms | 250.60 gms |
| H | 8 h | 1000° C. | 258.02 gms | 255.35 gms |
| I | 24 h | 1000° C. | 273.69 gms | 271.23 gms |

What is claimed is:

1. A self-supporting ceramic composite body comprising at least one filler embedded by a ceramic matrix, said ceramic matrix comprising a three-dimensionally interconnected oxidation reaction product and one or more metallic constituents of a parent metal comprising aluminum, said metallic constituents totalling no more than about 0.5% by weight of said ceramic composite body.

2. The ceramic composite body of claim 1, wherein said oxidation reaction product comprises aluminum oxide.

3. The ceramic composite body of claim 1, further comprising between about 2% and about 25% porosity.

4. The ceramic composite body of claim 3, wherein said porosity is accessible to an exterior surface of said ceramic composite body.

5. The ceramic composite body of claim 3, wherein said porosity is at least partially interconnected.

6. The ceramic composite body of claim 1, wherein said filler comprises one or more metal oxides, borides, nitrides, or carbides of a metal selected from the group consisting of aluminum, cerium, hafnium, lanthanum, silicon, neodymium, praseodymium, samarium, scandium, thorium, uranium, titanium, yttrium, and zirconium.

7. The ceramic composite body of claim 1, wherein said filler comprises a material selected from the group consisting of granules, fibers, whiskers, pellets, tubes and mixtures thereof.

8. The ceramic composite body of claim 1, wherein said filler comprises at least one material selected from the group consisting of alumina and silicon carbide.

9. The ceramic composite body of claim 1, further comprising no more than about 5 percent by weight zinc aluminate.

10. The ceramic composite body of claim 1, wherein said three-dimensionally interconnected oxidation reaction product comprises crystallites, wherein further adjoining crystallites define a grain boundary therebetween, and wherein still further said grain boundaries are substantially devoid of silicious phases.

11. The ceramic composite body of claim 10, wherein said grain boundaries have no other phase present.

12. A method for producing a self-supporting ceramic composite comprising (1) a ceramic matrix obtained by oxidation of a parent metal comprising an aluminum alloy to form a polycrystalline material comprising (a) an oxidation reaction product of the parent metal with at least one oxidant and (b) at least 0.5 percent by volume of an at least partially interconnected metal phase comprising residual non-oxidized metallic constituents of said parent metal; and (2) at least one filler embedded by the matrix, which method comprises:

(a) positioning a parent metal comprising aluminum and at least one dopant adjacent to a permeable mass of filler having at least one defined surface boundary and orienting said parent metal and said filler relative to each other so that formation of an oxidation reaction product of the parent metal with an oxidant will occur into said mass of filler and in a direction towards said defined surface boundary;

(b) heating said parent metal to a first temperature above its melting point but below the melting point of said oxidation reaction product to form a body of molten parent metal and reacting the molten parent metal with said at least one oxidant at said first temperature to form said oxidation reaction product, and at said first temperature maintaining at least a portion of said oxidation reaction product in contact with and extending between said body of molten metal and said at least one oxidant, to draw molten metal through the oxidation reaction product towards the at least one oxidant and towards and into the adjacent mass of filler so that oxidation reaction product continues to form within the mass of filler at the interface between the oxidant and previously formed oxidation reaction product, and continuing said reaction for a time sufficient to infiltrate said mass of filler to said defined surface boundary with a ceramic matrix, said ceramic matrix comprising said oxidation reaction product and said at least partially interconnected metal phase comprising at least two residual non-oxidized metallic constituents of said parent metal, said at least two metallic constituents including said at least one dopant and aluminum; and (c) heating the resulting infiltrated mass of step (b) in an environment selected from the group consisting of an inert atmosphere and a vacuum to a second temperature above the first temperature but below the melting point of the oxidation reaction product in order to remove at least a sufficient portion of substantially only said at least one dopant from said infiltrated mass, thereby preventing continued reaction of said residual parent metal constituent of said at least partially interconnected metal phase with at least said at least one oxidant at at least said first temperature.

13. The method of claim 12, wherein said at least one dopant comprises at least one material selected from the group consisting of magnesium, zinc, silicon, germanium, tin, lead, boron, sodium, lithium, calcium, phosphorus, yttrium and rare earth metals.

14. The method of claim 12, wherein said at least one dopant comprises at least one material selected from the group consisting of magnesium and zinc.

15. The method of claim 12, wherein said environment comprises an inert atmosphere comprising a nitrogen-containing atmosphere.

16. The method of claim 12, wherein said at least a sufficient portion comprises substantially all.

17. A method for producing a self-supporting ceramic composite comprising (1) a ceramic matrix obtained by oxidation of a parent metal comprising an aluminum alloy to form a polycrystalline material comprising (a) an oxidation reaction product of the parent metal with at least one oxidant and (b) at least 0.5 percent by volume of an at least partially interconnected metal phase comprising residual non-oxidized metallic constituents of said parent metal; and (2) at least one filler embedded by the matrix, which method comprises:

(a) positioning a parent metal comprising aluminum and at least about 1 percent by weight zinc adjacent to a permeable mass of filler having at least one defined surface boundary and orienting said parent metal and said filler relative to each other so that formation of an oxidation reaction product of the parent metal with an oxidant will occur into said mass of filler and in a direction towards said defined surface boundary;

(b) heating said parent metal to a first temperature above its melting point but below the melting point of said oxidation reaction product to form a body of molten parent metal and reacting the molten parent metal with said at least one oxidant at said first temperature to form said oxidation reaction product, and at said first temperature maintaining at least a portion of said oxidation reaction product in contact with and extending between said body of molten metal and said at least one oxidant, to draw molten metal through the oxidation reaction product towards the at least one oxidant and towards and into the adjacent mass of filler so that oxidation reaction product continues to form within the mass of filler at the interface between the at least one oxidant and previously formed oxidation reaction product, and continuing said reaction for a time sufficient to infiltrate said mass of filler to said defined surface boundary with a ceramic matrix, said ceramic matrix comprising said oxidation reaction product and said at least partially interconnected metal phase comprising at least two residual non-oxidized metallic constituents of said parent metal, said at least two metallic constituents including zinc and aluminum; and (c) heating the resulting infiltrated mass of step (b) in an environment selected from the group consisting of an inert atmosphere and a vacuum to a second temperature above the first temperature but below the melting point of the oxidation reaction product in order to remove at least a substantial portion of substantially only said residual zinc from said infiltrated mass, thereby preventing continued reaction of said parent metal of said at least partially interconnected metal phase with at least said oxidant at at least said first temperature.

18. The method of claim 17, wherein said parent metal comprises from about 4 percent to about 7 percent by weight zinc.

19. The method of claim 17, wherein said first temperature is about 940° C. and said second temperature is about 1000° C.

20. The method of claim 17, wherein said oxidant comprises air and said environment comprises nitrogen.

21. The method of claim 17, wherein said substantial portion comprises substantially all.

* * * * *